INVENTOR
H. D. HELMS
BY C. E. Hirsch Jr.
ATTORNEY

Sept. 19, 1967 H. D. HELMS 3,343,087

QUANTIZATION NOISE REDUCTION SYSTEM USING
CHIRP NETWORK PRIOR TO QUANTIZING

Filed Sept. 2, 1964 2 Sheets-Sheet 2

United States Patent Office 3,343,087

Patented Sept. 19, 1967

3,343,087

QUANTIZATION NOISE REDUCTION SYSTEM USING CHIRP NETWORK PRIOR TO QUANTIZING

Howard D. Helms, Brookside, N.J., assignor to Bell Telephone Laboratories, Incorporated, New York, N.Y., a corporation of New York Filed Sept. 2, 1964, Ser. No. 394,020
10 Claims. (Cl. 325—42)

This invention pertains to pulse transmission systems and, more particularly, to the processing of signals in such systems by means of quantization.

Quantization is a process by which the instantaneous amplitude of samples of a signal wave which may have any of a continuous range of values is represented as the nearest one of an arbitrarily chosen finite number of discrete amplitude levels. It finds especial use in communication systems which are designed to minimize the effect of noise in the transmission path.

The process of quantization, however, gives rise to error variations corresponding to the difference between the exact value of the message wave and the quantum level actually transmitted. These error variations are commonly referred to as quantization noise or quantizing distortion. This quantizing error may, in theory, be reduced to any desired value by increasing the number of the quantizing levels and decreasing the size of the quanta. However, increasing the number of levels increases the complexity of the equipment utilized, with a concomitant increase in cost, and decreasing the size of the quanta increases the signal's vulnerability to noise and distortion.

The effect of quantization noise is readily apparent when pulse systems are used for video transmission. The fine line gradations of a televised scene, when approximated by a finite number of quantum levels, are obliterated, and in their place appear uniform areas of brightness separated by definitely distinguishable borders referred to in the art as contour lines. In the case of audio signals, quantization noise is apparent as a regularly repetitive noise interfering with the reception of the message wave.

The principal object of the present invention is, therefore, to reduce the effect of quantization noise in systems which employ quantization.

Another object is to reduce the number of quantum levels required for pulse transmission without noticeably affecting the level of distortion.

These and other objects are accomplished, in accordance with the present invention, by statistically reordering the temporal distribution of quantization noise in a transmission system. This technique is similar, by way of analogy, to reordering the distribution of black and white marbles placed in a container. Assume that the marbles are arranged in alternating areas of black and white corresponding to objectionable video contour areas. If the distribution of the marbles is "randomized," interchanging some of the black and white marbles in the neighborhood of the contour lines, the distinguishable contour lines are dispersed and are replaced by random gradations of black to white. In both video and audio transmission, it has been found that a selective randomizing of quantization noise similarly reduces its perceptibility. Indeed, it substantially eliminates contour lines in televised scenes and repetitive distortion in audio signals introduced by the quantizing process.

In accordance with the present invention, quantization noise is randomized by passing an applied massage wave, prior to quantization, through a network characterized by a flat amplitude response and a phase response that varies parabolically with frequency. The delay of such an all-pass network, conventionally called a "chirp" network, varies linearly with frequency. Thus, a signal which has been passed through a chirp network is differentially delayed as a function of frequency, dispersing the frequency components of the signal in the time domain.

It has been previously recognized that dispersive networks may be used to reduce the effect of one distinct form of distortion, namely, "impulse noise." See, e.g., United States Patent 3,032,725, issued to J. Knox-Seith on May 1, 1962, wherein chirp networks are used to reduce the level of erratically occurring impulses below that of applied digital signals. Impulse noise is characterized by narrow spikes of energy which occupy an extremely small portion of the signal interval. It, therefore, lends itself to a "leveling" process whereby the energy contained in the narrow spikes is dispersed over the total signal interval resulting in a noise amplitude level less than that of the applied digital signals. In contrast to the impulse noise environment with which the Knox-Seith system copes, quantization noise occurs continuously over the entire signal interval and is intimately commingled with the message signal. This continuous mingling with the noise signal negates the feasibility of any leveling scheme.

The present invention, recognizing that quantization noise may not be leveled but rather must be statistically redistributed, turns this principle to account by dispersing an applied analog signal prior to quantization. The resulting statistical redistribution reduces the effect of quantization noise while simultaneously mitigating the effect of an impulse noise present. Conversely, prior art systems, as illustrated by the aforementioned Knox-Seith patent, wherein dispersive networks are positioned adjacent to the transmission path, would have no effect whatever on the quantization noise present.

Thus, in the system of the present invention, the message wave is dispersed by a chirp network prior to its application to a conventional pulse code modulation (PCM) link. The dispersed signal is sampled, quantized, and encoded preparatory to transmission. Encoded signals typically traverse a transmission path, which may itself be subject to diverse noise interferences, and are received at a distant station where they are applied to a decoder. Output signals from the decoder are processed by a dechirp network, i.e., a network having a delay characteristic complementary to that of the chirp network, which reconstitutes the dispersed message wave.

The applied message wave, e.g., a video signal, usually contains repeating sequences which cause the quantizer associated with the encoder in a conventional system to produce repeating sequences of quantization error, forming contours in the output picture. In the present system, the chirp network blends the repeating and nonrepeating components. This composite waveform causes the quantizer and the dechirp network to produce output wave forms which contain repeating and nonrepeating components simultaneously. The instantaneous power of the nonrepeating components, almost inevitably, exceeds the instantaneous power of the repeating components. Thus, the instantaneous power of the nonrepeating components of the quantization noise exceeds that of the repeating components, thereby preventing the appearance of contours or ripples of quantization noise in the output signal. Hence, quantization noise is statistically reordered, i.e., randomized so that it closely resembles thermal noise. Since randomized quantization noise is less perceptible, the number of quantum levels may therefore be reduced, effecting a substantial saving in apparatus.

These and further features and objects of the invention, its nature and various advantages, will be readily apparent upon consideration of the attached drawings and of the following detailed description of the drawings.

In order to facilitate an understanding of the invention, the drawings have been simplified wherever possible. For example, synchronizing circuits are not shown. The manner in which they must be used in a pulse code modulation transmission system is well known to those skilled in the art. Moreover, it should be noted that block diagrams are used throughout to indicate apparatus for performing specified operations on signals applied thereto. It is believed that these simplifications are justified since they avoid a plethora of details common to the operation of all pulse code modulation systems. The essential elements of a typical pulse code modulation transmission system are described in volume 27 of the Bell System Technical Journal, 1948, pages 1–57.

Figure 1:
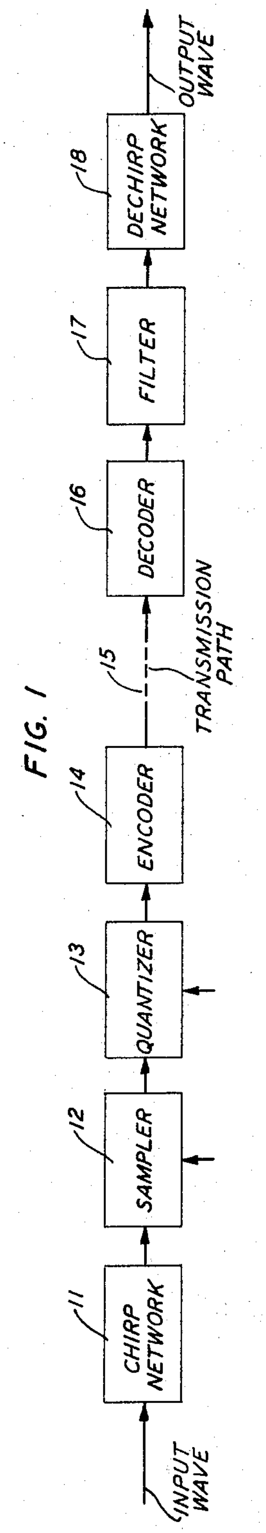
FIG. 1 is a schematic block diagram illustrating a preferred embodiment of the invention.
Figure 2A:
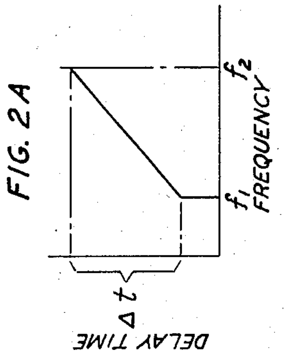
FIGS. 2A and 2B illustrate the delay-frequency characteristic of complementary chirp networks used in the practice of this invention.

As illustrated in FIG. 1, an input wave, which may be either a video or audio signal, is applied to a chirp network 11. Network 11 disperses the applied signal in accordance with the characteristic shown in FIG. 2A. It may be seen from FIG. 2A that the frequency components of the applied signal are differentially delayed in a linear manner. Chirp networks of this type are well known in the art. See, for example, T. R. Meeker's article in the Institute of Radio Engineers' Transactions on Ultrasonic Engineering, volume UE–7, page 53, 1960.

The dispersed signal developed by chirp network 11 is applied to a sampler 12 which periodically samples the message wave under the control of timing pulses provided by a synchronizing timing source (not shown). The sampler 12 is advantageously electronic in nature and may, for example, be of the kind described on pages 26 and 27 of the aforementioned Bell System technical volume. The sampling interval chosen is generally related to the bandwidth of the message wave. This interval should be no greater than half the period of the highest frequency message component to be reproduced, i.e., the sampling rate should not be less than twice the frequency of the highest frequency component. As is well known to workers in the communications art, the information content of a wave may be transmitted without loss of information by transmitting samples thereof consonant with this sampling criterion.

Successive samples of the dispersed message wave are supplied to a quantizer 13 where the amplitude of a sample is translated into the nearest one of a fixed number of quantizing levels under control of timing pulses provided by a timing source (not shown). The quantizer 13 may take a variety of forms. If desired, the quantizing operation may be integrated with the coding operation. Such an arrangement is described on page 47 of the aforementioned Bell System Technical Journal volume. The successive quantized samples are thereafter encoded in a suitable code. As indicated above, the function of encoder 14 can, for example, be combined with that of quantizer 13 to provide a binary pulse code output. Alternatively, binary pulse coding may be achieved by apparatus of the kind described in United States Patent 2,449,467 issued on September 14, 1948 to W. M. Goodall.

Figure 2B:
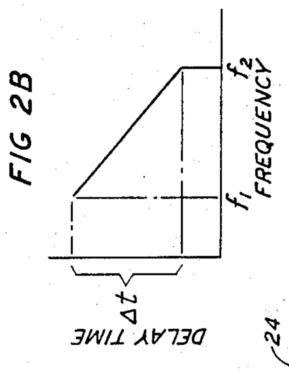

The coded pulses are applied to suitable transmitting equipment (not shown) for transmission over path 15 and for eventual reception at a receiving station. Received pulses are applied to decoder 16 which may be similar to that described on page 36 of the aforementioned volume and which serves to reform the message wave from the succession of transmitted pulses. The reformed wave passes through a low pass filter 17 to eliminate extraneous high frequency components in the wave. The wave appearing at the output of filter 17 is applied to a dechirp network 18 which may be the same as network 11 but which has a complementary characteristic as illustrated in FIG. 2B. Dechirp network 18 serves to reconstitute the dispersed applied signal, and at the same time to randomize quantization noise introduced by quantizer 13.

Thus, by the practice of this invention, the repetitive portions of the input message wave which cause the quantizer to produce quantization errors are blended with the nonrepetitive portions of the message wave by the chirp network. The dechirp network reconstructs the message wave while, simultaneously, reordering the statistical distribution of the noise, thereby substantially reducing its perceptibility.

Figure 3:
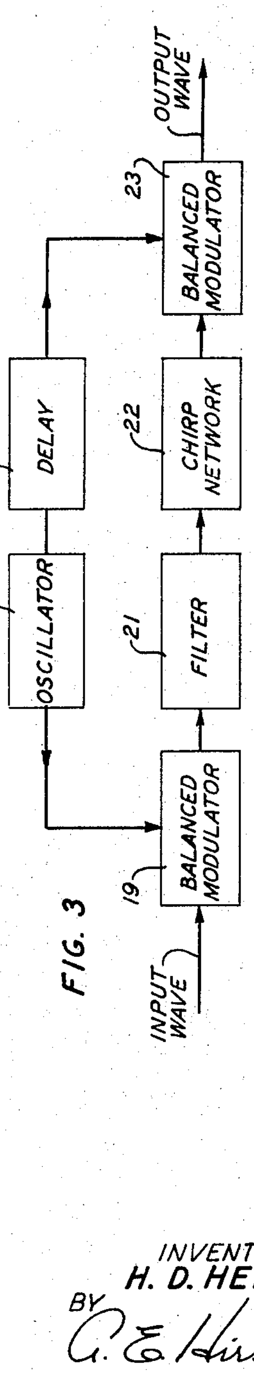
FIG. 3 illustrates in block diagram form a circuit for accommodating the frequency interval of a chirp network by translating the frequency of the message.

The circuit of FIG. 3 is used when the frequency interval which can be accommodated by an available chirp network is offset from the frequency band of the message wave. Input video or audio signals are applied to a balanced modulator 19 wherein a modulation product of the input signal and output of oscillator 25 is formed. The frequency of oscillator 25 is adjusted to translate the message wave to the frequency interval of interest. A double sideband signal with suppressed carrier appears at the output of modulator 19. Balanced modulators are well known in the art and are described in "Information Transmission, Modulation, and Noise," pages 102–106, authored by M. Schwartz, McGraw-Hill (1959). The lower sideband of the signal developed by modulator 19 is removed by filter 21. The input message wave, now translated to the frequency interval of the chirp, is applied to chirp network 22 wherein it is dispersed as described above. This dispersed message wave is, in turn, applied to balanced modulator 23 where it is translated back to the original frequency band of the message wave. Network 24 delays the modulating signal of oscillator 25 by an interval corresponding to the delay, introduced by chirp network 22, of the lowest frequency component in the message wave. The output of modulator 23 is then applied to sampler 12 in the PCM link of FIG. 1. The preceding principles discussed are, of course, similarly applicable to dechirp networks. Indeed, because of the symmetrical characteristic of network 22 the circuit of FIG. 3 may be used for dechirping if filter 21 removes the upper sideband of the modulated signal.

Figure 4:
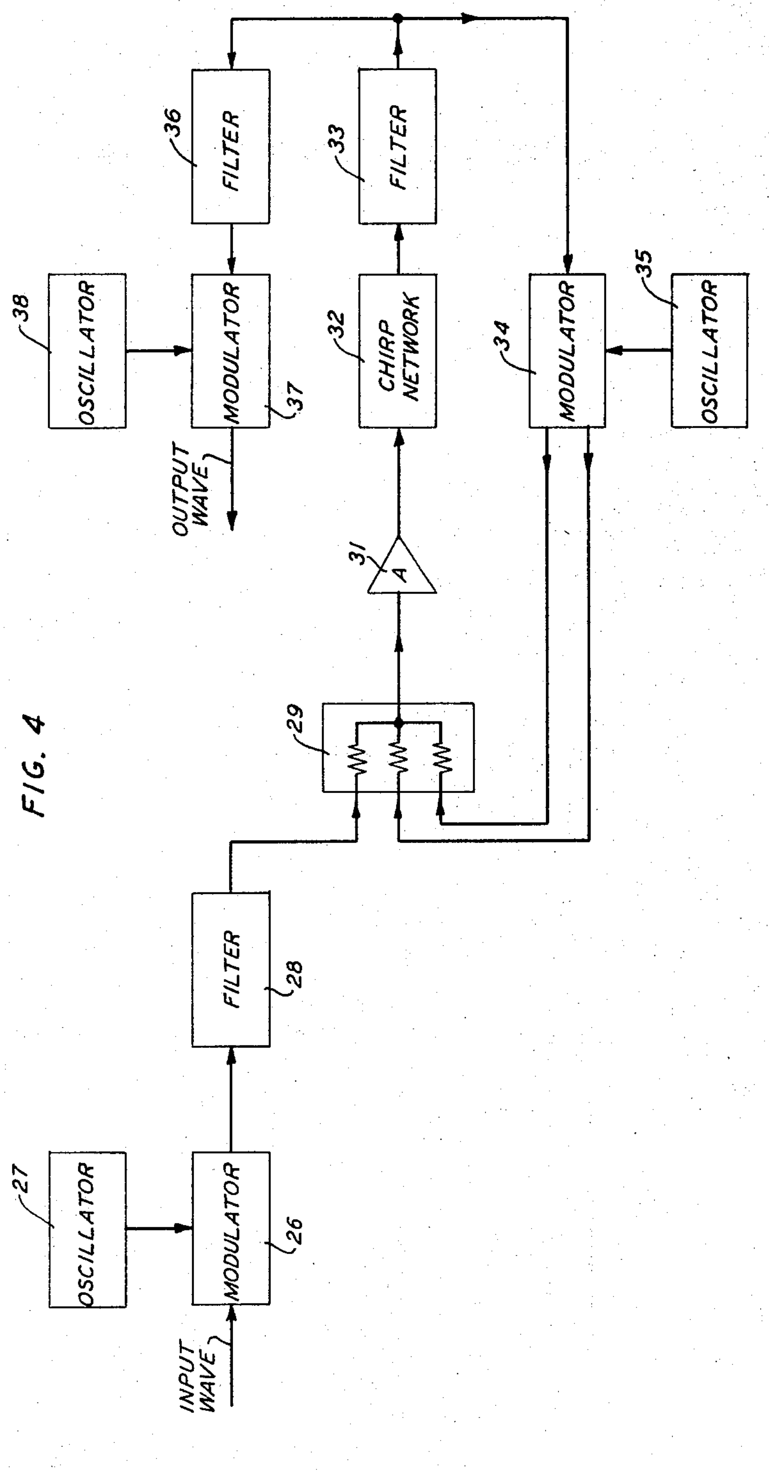
FIG. 4 illustrates in block diagram form a circuit for extending the delay of a chirp network in accordance with the invention.

FIG. 4 illustrates a circuit which extends the total delay time of the chirp network, increasing the number of components simultaneously processed, thereby improving the "randomization" process. A single sideband of the modulated message wave is recirculated about a loop including a chirp network. On each traverse, the frequency band is increased in frequency by an increment corresponding to the frequency of an oscillator in the recirculating loop. The message wave therefore precesses in the frequency domain and is differentially delayed with each traverse until the translated frequency band is at a desired value. A high pass filter with a corresponding pass band delivers the translated signal to a modulator where it is returned to baseband frequency.

More particularly, an applied message wave, e.g., an audio signal of 5 kilocycle bandwidth, is modulted with the output of oscillator 27 in balanced modulator 26 to translate the message frequency band to the frequency interval of chirp network 32. Filter 28 removes one sideband, preferably the lower one. The single sideband of information is applied via summing network 29 to amplifier 31 and then to chirp network 32 wherein the frequency components of the message wave are differentially delayed. This dispersed signal is transmitted by filter 33 and applied to single sideband modulator 34 which may be of the type described on pages 106–107 of the aforementioned Schwartz reference. The signal is modulated with the output of oscillator 35, translating the sideband of information in the frequency domain an increment corresponding to the frequency of oscillator 35. The resulting signal is again applied via summing network 29 and amplifier 31 to chirp network 32 and subjected to an additional delay. After a predetermined number of traverses, the translated signal is within the bandpass of high pass filter 36. Advantageously, the frequency interval of chirp network 32 may extend between 2000 ks. and 2500 kc. The recirculating signal may then be incremented in 5 kc. steps, resulting in one hundred traverses through the chirp network and a hundredfold increase in delay. The pass band of low pass filter 33 is contiguous with that of filter 36 and therefore inhibits further recirculation of the translated message wave. After progressing through filter 36, the translated message wave is modulated with the output of oscillator 38 in balanced modulator 37 and thereby returned to baseband frequency. The resultant dispersed signal is then applied to sampler 12 of FIG. 1.

It is to be understood that the embodiments shown and described herein are illustrative and that further modifications of this invention may be made by those skilled in the art without departing from the scope and spirit of the invention. For example, the principles of this invention may be applied to systems wherein multiple PCM links are used for recoding and retransmission. Ordinarily, the power of the noise introduced by the quantizers in the successive PCM links increases in proportion to the square of the number of links, drastically increasing the level of signal degradation. In accordance with the principles of the present invention, chirp networks with different delay differences, $\Delta t$ in FIG. 2, may be used in the successive links. The power of the randomized quantization noise is therefore increased only in direct proportion to the number of links, significantly reducing the level of degradation.

What is claimed is:

1. A pulse code transmission system comprising;
means for selectively delaying components of an applied signal as a function of frequency,
means for sampling said delayed components at a regularly recurring rate,
quantizing means responsive to said sampled components for developing discrete amplitude signals corresponding to a predetermined scheme,
means for encoding said quantized signals,
transmission means,
means for decoding signals conveyed by said transmission means,
and means responsive to said decoded signals for statistically reordering the continuously present error variations introduced by said quantizing means, said means simultaneously reconstituting on the time scale said delayed components.

2. A transmission system as defined in claim 1 wherein said delaying means comprises;
means for translating the frequency band of said applied signal to a specified frequency interval,
a chirp network exhibiting a substantially linear delay versus frequency characteristic over said specified frequency interval for delaying said components as a function of frequency,
and means for translating said delayed components back to their original frequency band.

3. A transmission system as defined in claim 1 wherein said delaying means comprises:
means for translating the frequency of said applied signal,
a chirp network for dispersing said translated signal,
means for recirculating said translated signal through said chirp network, means for increasing the frequency of said signal a specified increment with each circulation,
and means for returning said recirculated signal to the frequency band of said applied signal after a predetermined number of circulations.

4. A transmission system as defined in claim 1 wherein said reordering means further comprises a dechirp network.

5. A pulse code transmission system comprising:
a chirp network for delaying the frequency components of an applied signal,
means for sampling said delayed components at a regularly recruiting rate,
quantizing means responsive to said sampled components for developing discrete amplitude signals corresponding to a predetermined scheme,
means for encoding said quantized signals,
transmission mesns,
means for decoding signals conveyed by said transmission means,
and a dechirp network responsive to said decoded signals for statistically reordering the continuously present error variations introduced by said quantizing means, said dechirp network simultaneously reconstituting on the time scale said delayed components.

6. A pulse code transmission system comprising:
a chirp network for dispersing the frequency components of an applied signal,
means for sampling said dispersed components at a regularly recurring rate,
quantizing means responsive to said sampled components for developing discrete amplitude signals corresponding to a predetermined scheme,
means for encoding said quantized signals,
transmission means,
means for decoding signals conveyed by said transmission means,
and a dechirp network responsive to said decoded signals for reconstituting into their original order said dispersed components and simultaneously reordering the statistical distribution of noise introduced by said quantizing means.

7. A pulse transmission system comprising:
a first all-pass network having a substantially linear delay versus frequency characteristic responsive to applied input signals for selectively delaying frequency components of said input signals,
means responsive to said delayed components for periodically sampling said components,
quantizing means responsive to said sampled components for developing discrete amplitude signals of said sampled components,
means including coding means for efficiently transmitting said quantized signals,
and a second all-pass network having a characteristic complementary to that of said first network for reconstructing said delayed signal components whereby error variations introduced by said quantizing means are converted into pseudo-thermal noise.

8. An intelligence transmission system of the type in which an intelligence signal is converted into a pulse-amplitude modulated signal which signal in turn is quantized into a definite number of quanta comprising, in combination;
a first all-pass network having a substantially linear delay characteristic for differentially delaying respective frequency components of an applied intelligence signal prior to said modulation and said quantization,
and a second all-pass network having a characteristic complementary to that of said first network for reconstituting said intelligence signal at the output of said system whereby error variations introduced by said quantization are randomized, substantially reducing the perceptibility of said variations.

9. An intelligence transmission system wherein applied analog signals are sampled, quantized and coded for efficient transmission comprising, in combination:

first frequency dispersive apparatus for processing said analog signals prior to quantization, transmission means, and second complementary frequency dispersive apparatus for reconstructing said dispersed signals after transmission whereby noise introduced by said quantization is randomized substantially reducing its perceptibility.

10. Apparatus including a pulse code transmission system utilizing quantization comprising, in combination:

a first chirp network for selectively dispersing frequency components of an applied analog signal prior to quantization, and a second chirp network positioned at the receiving end of said transmission system for reconstituting into their original order said dispersed components and reordering the statistical distribution of noise introduced by said quantization.

References Cited

UNITED STATES PATENTS

| | | | |
|---|---|---|---|
| 2,669,608 | 2/1954 | Goodall | 325—42 |
| 3,032,725 | 5/1962 | Knox-Seith | 333—20 |
| 3,244,808 | 4/1966 | Roberts | 325—42 |

JOHN W. CALDWELL, *Acting Primary Examiner.*

J. TERRY STRATMAN, *Assistant Examiner.*